No. 680,033. Patented Aug. 6, 1901.
J. FELLOWS.
SHARPENING DEVICE FOR CUTTERS.
(Application filed Dec. 23, 1899.)
(No Model.) 2 Sheets—Sheet 1.

Witnesses:

Inventor:-
Joseph Fellows.
by his Attorneys

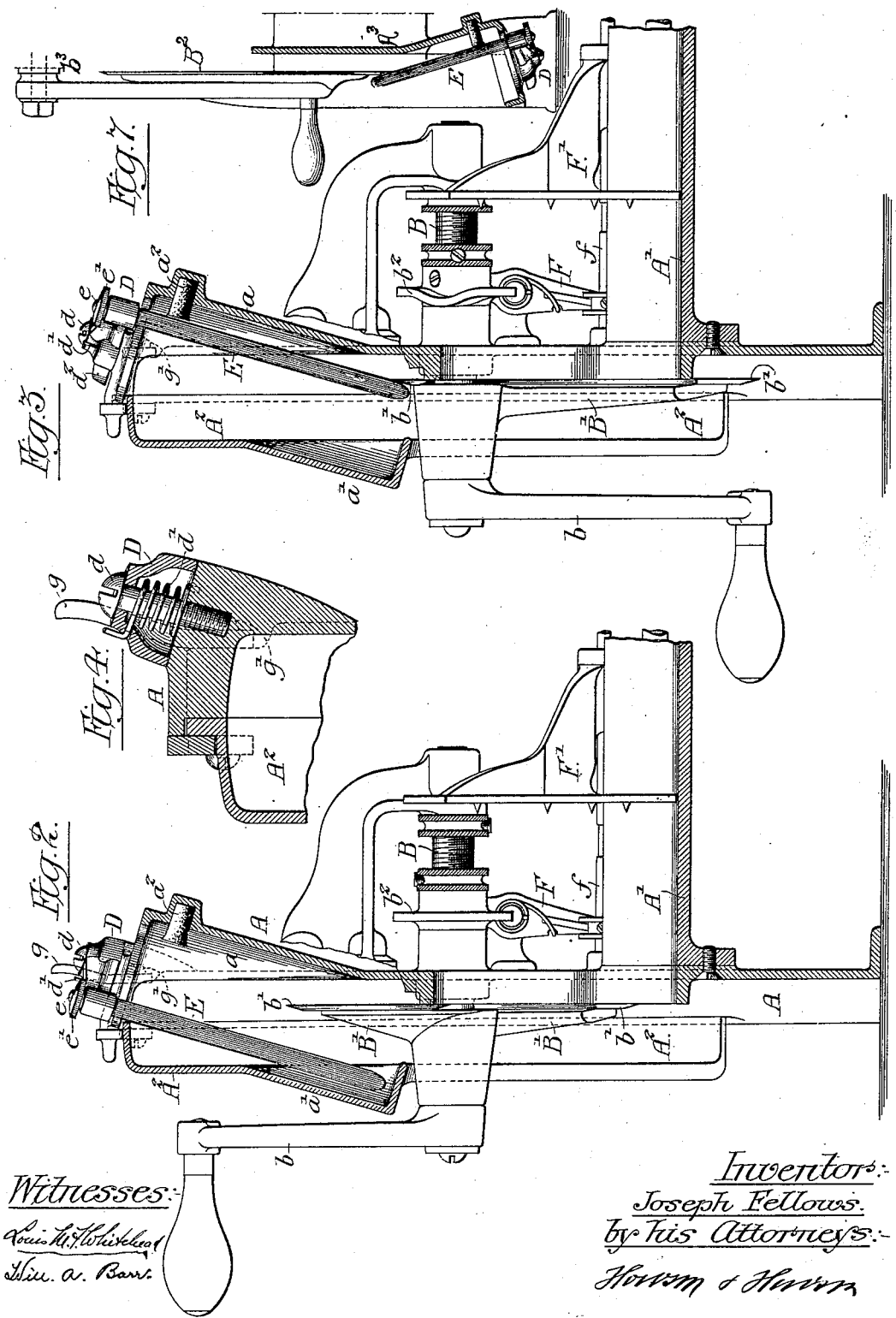

UNITED STATES PATENT OFFICE.

JOSEPH FELLOWS, OF PHILADELPHIA, PENNSYLVANIA.

SHARPENING DEVICE FOR CUTTERS.

SPECIFICATION forming part of Letters Patent No. 680,033, dated August 6, 1901.

Application filed December 23, 1899. Serial No. 741,460. (No model.)

*To all whom it may concern:*

Be it known that I, JOSEPH FELLOWS, a citizen of the United States, residing in Philadelphia, Pennsylvania, have invented certain Improvements in Sharpening Devices for Cutters or Shavers, of which the following is a specification.

My invention relates to certain improvements in sharpening devices for the knives of a slicing and shaving machine, such as used for slicing meat, bread, fodder, &c.

The object of my invention is to so construct the device that the sharpener will when thrown into operative position sharpen the entire edge of the blade.

Figure 1:
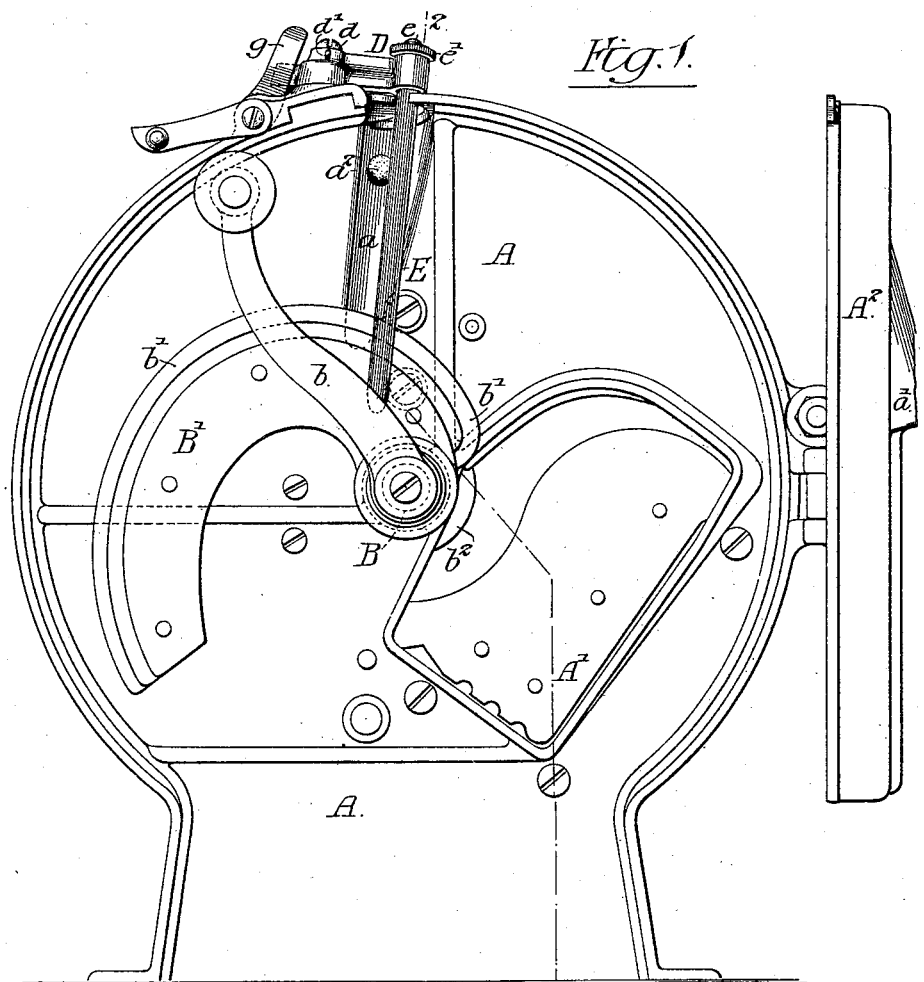
Figure 5:
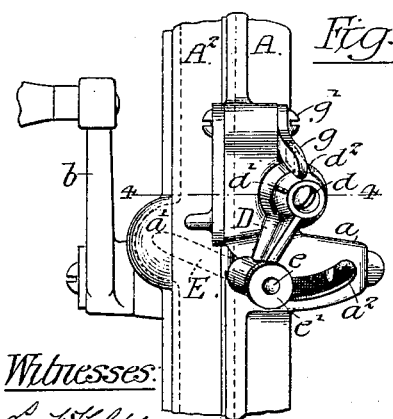
Figure 6:
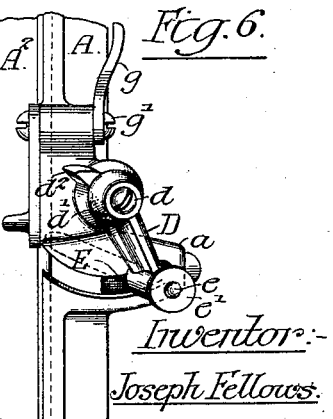

In the accompanying drawings, Figure 1 is an end view of a rotary food cutter or slicer with the cover-plate open and illustrating my invention. Fig. 2 is a section on the line 2 2, Fig. 1, showing the sharpener out of engagement with the knife. Fig. 3 is a view similar to Fig. 2, showing the sharpener in the path of the knife. Fig. 4 is an enlarged sectional view on the line 4 4, Fig. 5. Fig. 5 is a plan view of part of Fig. 2. Fig. 6 is a plan view of part of Fig. 3, and Fig. 7 is a view showing the sharpener applied to a vibrating knife food-cutter.

A is the frame of the machine.

A' is the trough in which the food to be cut is placed.

B is the knife-shaft having a suitable handle $b$.

B' is the blade-carrier, and $b'$ is the knife-blade. The blade-carrier and blade are curved in form, as shown in Fig. 1, so as to make a shear cut when passing the edge of the trough.

On the shaft B is a cam $b^2$, engaging an arm of a lever F, actuating a feed-rod $f$, frictionally connected to a pusher F'. This construction is fully illustrated by an application for patent filed by me on the 7th day of December, 1899, Serial No. 739,539, my present invention relating solely to the sharpening mechanism.

D is an arm attached to the frame A by a pivot-screw $d$, and the hub of this arm is hollow, and within this hollow hub is a coiled spring $d'$. The spring surrounds the pivot and one end is attached to the casing and the other end is attached to the arm.

Secured to the end of the arm D is a sharpener E, consisting of a long steel rod, in the present instance having a ribbed or otherwise roughened surface. This rod is adapted to a socket in the end of the arm D and has a screw-threaded portion $e$, on which is a nut $e'$, confining the sharpener to the arm. When it is wished to turn the sharpener in the arm, the nut is released and the sharpener can be turned, so as to present a new surface to the knife.

The knife-blade $b'$ is beveled at an angle on the outer side, so as to produce a sharp cutting edge, and the sharpener E is raked at the same angle, so that the sharpener when in contact with the knife, as shown in Fig. 3, will bear against the entire beveled surface of the knife.

When the sharpener is in the position shown in Fig. 2, it is out of contact with the knife, being held out of contact by a latch $g$, pivoted at $g'$ to the casing A. This latch rests in front of a lug $d^2$ on the hub of the arm D, as clearly shown in Fig. 5. When it is wished to allow the sharpener to come in contact with the knife, the latch $g$ is thrown back, as shown in Fig. 6, releasing the hub, and the spring $d'$ within the hub will force the sharpener into the path of the knife.

The casing A is recessed at $a$, and the cover-plate $A^2$ is recessed at $a'$, so as to give sufficient room for the sharpener to move to its two extreme positions. Within the recess $a$ is a buffer $a^2$, of rubber or other suitable material, so that when the knife passes the sharpener the sharpener will strike against the buffer and be held within the path of the knife, so that it will bear against the beveled edge in making the next revolution.

In Fig. 7 I have shown the sharpener applied to a food-slicer having a vibrating blade. The blade $B^2$ is pivoted at $b^3$ to the frame $A^3$, and the position of the sharpener is reversed, gaining the same results as in the device shown in Fig. 1. Thus I am enabled to make a very simple attachment which can be applied to any rotary or vibrating knife food cutter or slicer, and my invention can be applied to the general form of cutters in which a beveled knife-blade is carried by a shaft, whether for cutting food or other material.

It will be understood that the normal position of the sharpener is out of engagement with the knife, and when it is desired to sharpen the blade all that is necessary is to release the arm carrying the sharpener, and by turning the knife-shaft a few turns the knife will be sharpened ready for use, and the sharpener can be held out of the path of the knife by turning the arm D and holding it out of engagement by the latch g.

It will be noticed that the sharpener is in its extreme inner position when in contact with the portion of the knife-blade nearest the shaft, as in Fig. 3, and the knife-blade will gradually force the sharpener out as its shaft is turned; but this does not affect the angle of the sharpener, as its movement is parallel, so that the bevel of the knife is the same at all points, and the sharpener being pivoted, as shown, a slight rotary motion is given to the sharpener, thus presenting an extended surface to act on the blade.

It will be noticed that by having the sharpener elongated, as shown, in the form of an ordinary steel the full length of the steel comes in contact with the knife during different points of the stroke. Thus the life of the sharpener is materially increased.

I claim as my invention—

1. The combination in a cutter, of a frame, a rotatable knife-blade supported thereon, with a relatively-elongated sharpener for the knife pivotally carried by the frame, said sharpener being supported with its long axis parallel to the bevel edge of the blade and connected to said frame by a construction permitting it to be bodily moved toward and from the said beveled edge, while preserving the same angular relation thereto, substantially as described.

2. The combination in a cutter, of a frame, a rotatable knife-blade having a shaft operating in bearings therein, with a relatively-elongated sharpener for said knife, a device pivotally supporting said sharpener upon the frame whereby it is permitted to be bodily moved toward and from the bevel edge of the knife-blade while preserving the same angular relation thereto and a device tending to rotate the sharpener on its pivot and constructed to force said sharpener into contact with the bevel edge of said blade, substantially as described.

3. The combination of a cutter having a rotatable knife-blade with a relatively-elongated sharpener of circular cross-section constructed to act against the side of said knife-blade, said sharpener being pivotally supported so that it is permitted to be moved toward and from the side of the knife-blade while preserving the same angular relation thereto, a device tending to rotate the sharpener on its pivot toward the blade and a second device constructed to prevent such motion, substantially as described.

4. The combination in a cutting-machine, of a frame, a knife-blade pivoted thereon, an arm also pivoted to the frame, a sharpener attached to said arm having its long axis extending approximately parallel to the bevel of the cutting edge of said knife, the pivotal point of the arm being placed on the frame so that any motion of the sharpener is at right angles to the bevel of the knife, substantially as described.

5. The combination of a frame, a knife pivoted thereto, an arm pivoted on said frame, a sharpener carried by said arm and capable of being moved to bear against the cutting edge of the knife, a projection on said arm and a lever pivoted to the casing constructed to engage said projection and thereby prevent the sharpener from coming into engagement with the knife edge, substantially as described.

6. The combination of a cutter having a pivoted knife-blade with a beveled face and curved edge eccentric in respect to the axis of said pivot, a sharpener for bearing against the beveled face of the blade, and means for mounting said sharpener whereby it is movable from and toward the beveled face of the blade while preserving a constant angular relation thereto, substantially as described.

7. The combination of the frame of a food-cutter, a shaft mounted on said frame, a beveled knife carried by said shaft, a cap-plate forming with the frame a casing in which the knife rotates, a pivoted sharpener arranged on the same angle as the bevel of the knife-blade, the casing and the cover-plate being recessed for the reception of the sharpener, substantially as described.

8. The combination of the frame of a food-cutter, a shaft mounted in said frame, a beveled knife carried by said shaft, a cap-plate forming with the frame a casing in which the knife rotates, a pivoted sharpener arranged on the same angle as the bevel of the knife-blade, the casing being recessed for the reception of the sharpener, and a buffer within said recess against which the sharpener strikes, substantially as described.

9. The combination of the frame of a food cutter or slicer, a shaft, a beveled knife carried by said shaft, an arm pivoted to the casing, said arm having a hollow hub, a spring within the hollow hub, a sharpener detachably secured to the end of the arm, the arm and sharpener being raked on the same line as the bevel of the knife-blade, the spring tending to force the sharpener in the path of the knife-blade, and means for holding the sharpener out of the path of the knife-blade, substantially as described.

In testimony whereof I have signed my name to this specification in the presence of two subscribing witnesses.

JOSEPH FELLOWS.

Witnesses:
WILL. A. BARR,
JOS. H. KLEIN.